Nov. 21, 1967  L. F. NIEBERGALL  3,353,680
DUAL ELEMENT PARALLEL FLOW FILTER ASSEMBLY
Filed July 6, 1964  2 Sheets-Sheet 2
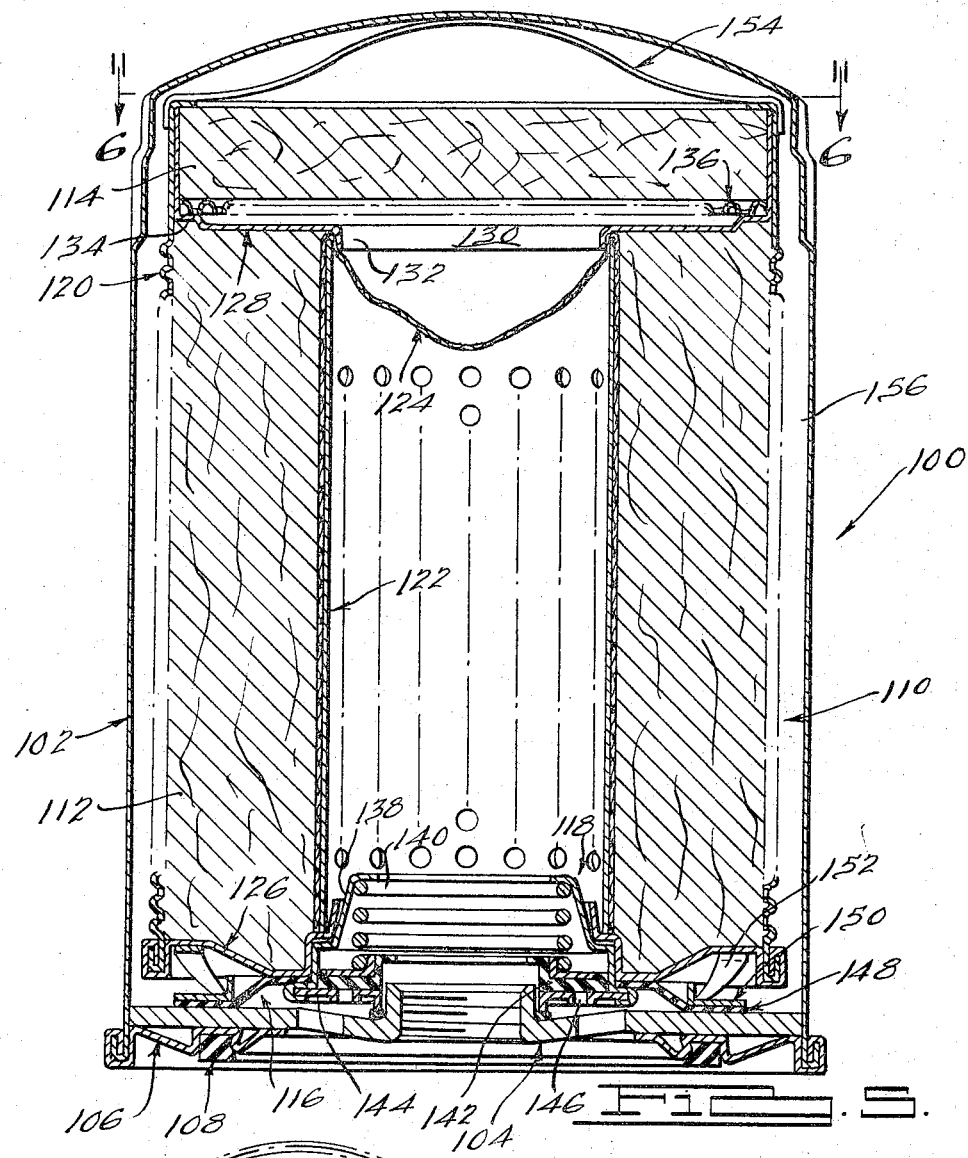
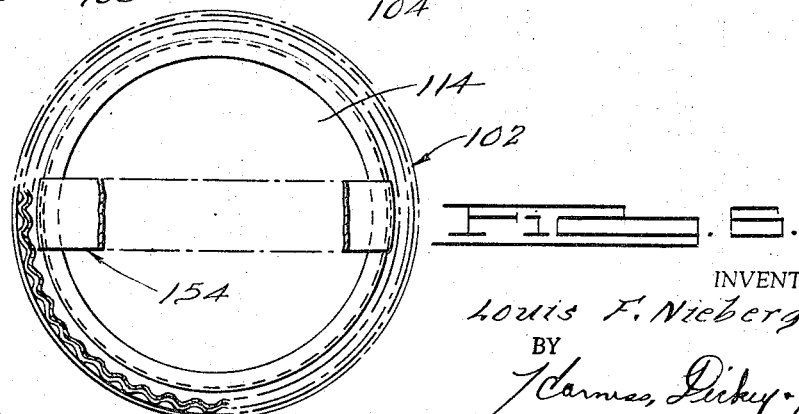
INVENTOR.
Louis F. Niebergall
BY
Carnes, Dickey - Pirie
ATTORNEYS

# United States Patent Office 3,353,680
Patented Nov. 21, 1967

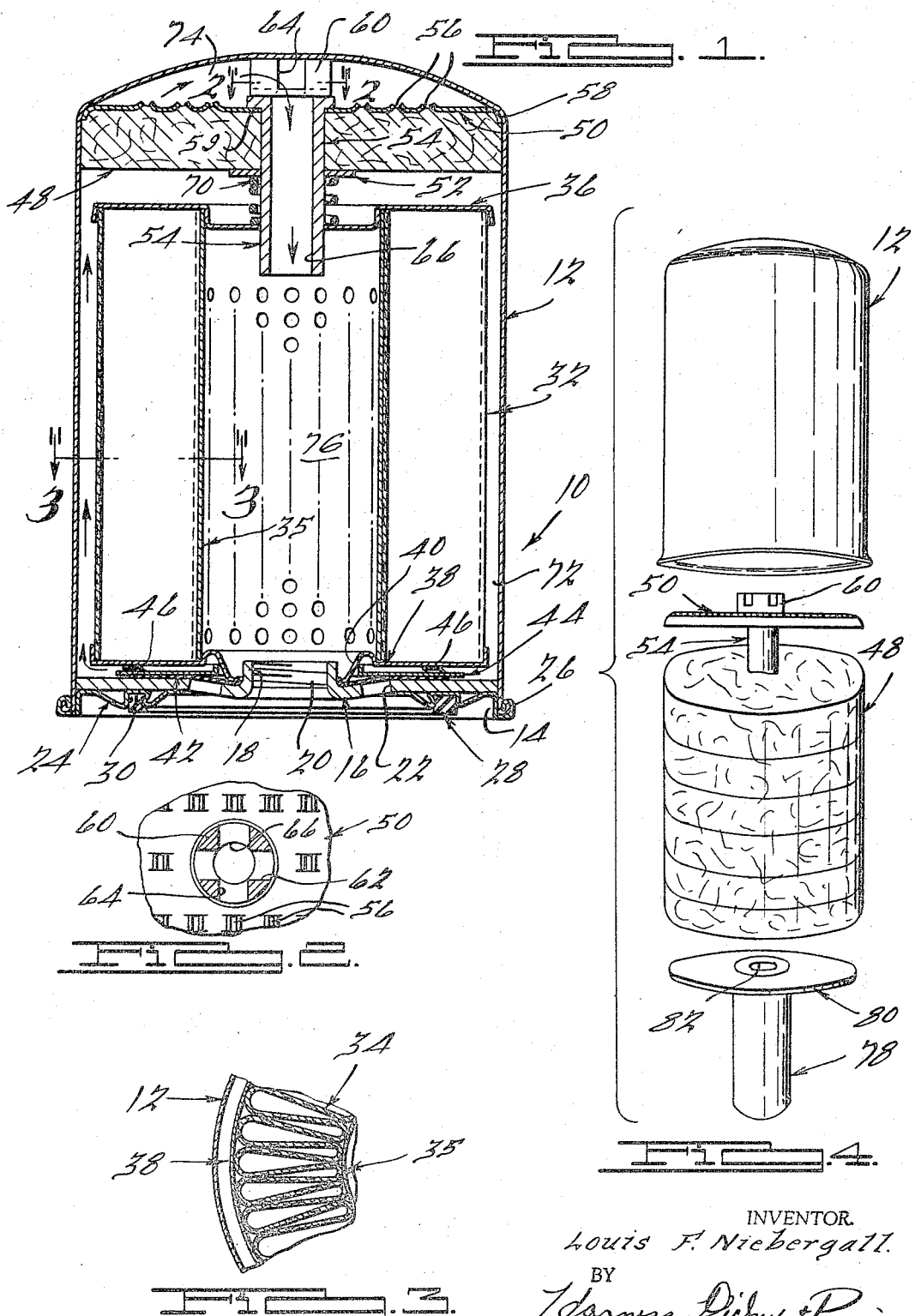

3,353,680
**DUAL ELEMENT PARALLEL FLOW
FILTER ASSEMBLY**
Louis F. Niebergall, Racine, Wis., assignor to Walker
Manufacturing Company, Racine, Wis., a corporation
of Delaware
Filed July 6, 1964, Ser. No. 380,514
1 Claim. (Cl. 210—314)

This invention relates generally to fluid filters, and more particularly, to a disposable or throwaway two-stage oil filter for use in the lubrication system of an internal combustion engine.

In general, the disposable oil filter of the present invention is characterized by a filtering media comprising two different porosity or flow restrictive filter elements, the more porous or less restrictive of which is arranged such that oil flows therethrough at a substantially constant velocity, resulting in a minimum back pressure across this filter element and a corresponding high filtering efficiency.

The oil filter of the present invention is further characterized by a filtering media comprising two different flow restrictive filter elements, one of which is adapted to be molded into its operative configuration directly with the filter shell or casing in which it is to function, thereby obviating the need for expensive molding equipment and the manufacturing steps heretofore required to operate such equipment.

It is accordingly a primary object of the present invention to provide a two-stage filter unit of the above character wherein constant velocity filtration is provided through at least a portion of the filtering media.

It is another object of the present invention to provide a disposable two-stage filter unit wherein one of the two filter elements incorporated therein is adapted to be molded directly within the filter shell or casing.

It is still another object of the present invention to provide a disposable filter unit of the above character wherein the oil being filtered therethrough may flow in either a radial or axial direction.

It is yet another object of the present invention to provide a disposable filter unit of the above character wherein the two filter elements are arranged such that a dimensional change of the low porosity filter element (as upon absorbing moisture, chemicals, etc.) will not adversely affect the filtering properties of the high porosity filter element adjacent thereto.

It is a further object of the present invention to provide a disposable filter unit of the above character wherein the filter element molded within the filter shell or casing provides a circumferential oil-tight seal with the filter shell or casing.

It is still a further object of the present invention to provide a method of molding a filter element directly within the filter casing or shell with which it is to be operatively associated, thereby providing a filter which is both simple in construction and economical to commercially produce.

Other objects and advantages of the present invention will become apparent from the following detailed description taken in conjunction with the accompanying drawing, wherein:

FIGURE 1 is a longitudinal cross-sectional view of an exemplary embodiment of the disposable filter unit of the present invention;

FIGURE 2 is a fragmentary top elevational view taken along the line 2—2 of FIGURE 1;

FIGURE 3 is a fragmentary cross-sectional view taken along the line 3—3 of FIGURE 1;

FIGURE 4 is an exploded view illustrating a step in molding one of the filter elements associated with the disposable filter unit illustrated in FIGURE 1;

FIGURE 5 is a longitudinal cross-sectional view of an alternate embodiment of the disposable filter unit of the present invention; and FIGURE 6 is a transverse cross-sectional view of the filter unit illustrated in FIGURE 5, taken along the line 6—6 thereof.

Referring now to FIGURE 1 of the drawing, a disposable oil filter unit 10, in accordance with an exemplary embodiment of the present invention, includes an inverted cup-shaped filter shell or casing 12 which is formed with a lower open end 14. Mounted within the end 14 is a relatively heavy gauge reinforcing plate 16 that is formed with a central upwardly extending neck or sleeve section 18 defining an outlet passage 20, and with a plurality of circumferentially spaced inlet ports 22 formed radially outward from the outlet passage 20. The reinforcing plate 16 is secured within the open end 14 of the shell 12 by an annular base plate 24 which is attached around its inner periphery to the lower side of the reinforcing plate 16, as by spotwelding, and is secured at its outer periphery to the lower end of the filter housing 12 in a fluid-tight roll seam or joint 26. A ring-shaped gasket 28, which is preferably constructed of synthetic rubber or a similar oil resistant sealing material, is secured within a crimped channel 30 formed on the lower side of the base plate 24 and is adapted to provide an oil-tight seal for an oil inlet chamber that is formed when the filter unit 10 is operatively mounted on the filter mount of an automotive engine (not shown). The sleeve section 18 of the reinforcing plate 16 is internally threaded and is thereby adapted to be screwed onto the standpipe of the filter mount to operatively secure the filter unit 10 thereto.

Contained within the filter casing 12 is a pair of different porosity or flow restrictive filter elements, the first of which comprises the low flow (low porosity) filter element of the filter 10 and is in the form of a filter cartridge 32 whose filtering media consists of an annulus of pleated filter paper 34 extending around a perforate cylindrical center tube 35, as seen in FIGURE 3. It may be noted that the construction of the cartridge 32 is intended to be merely exemplary insofar as filter cartridges are concerned, and that it may utilize any of a number of well known oil filtering medias, for example, the low flow filtering media incorporated in the filter cartridge shown in FIGURE 5. As seen in FIGURE 1, the upper and lower ends of the filter cartridge 32 are closed by end caps 36 and 38, respectively. The lower end cap 38 is formed with a downwardly and radially inwardly extending flange section 40 which bears upon the top of the reinforcing plate 16 coaxially of the sleeve section 18 thereof.

An antidrain or check valve is provided in the filter unit 10 through the use of a resilient and deformable valve disc 42 which bears upon the upper surface of the reinforcing plate 16 in a position overlying and closing the plurality of inlet ports 22. The radially inner edge of the valve disc 42 is secured to the top of the reinforcing plate 16 by being compressed between the plate 16 and the inner edge of the flange section 40 of the filter cartridge's lower end cap 38. It will be noted that the radially inner edge of the disc 42 acts as a gasket means to prevent oil from passing between the flange section 40 and the top of the reinforcing plate 16. The disc 42 is normally maintained in the position illustrated in FIGURE 1 by an annular valve plate 44 which is disposed coaxially of the sleeve section 18 interjacent the valve disc 42 and the filter cartridge end plate 38. The plate 44 is formed with a plurality of circumferentially and upwardly extending tang sections 46 which resiliently bear against the bottom surface of the end cap 38, thereby yieldably engaging the valve disc 42 with the top of the reinforcing plate 16, whereby the ports 22 are effectively sealed.

The second of the two filter elements which are incorporated in the filter device 10 is in the form of a substantially flat annular or disc-shaped filter element, generally designated 48, that is designed to be somewhat less restrictive (more porous) than the filter cartridge 32, and thus comprises the high flow filter element of the filter device 10. The element 48 is disposed within the filter casing 12 directly above the end cap 36 of the filter cartridge 32 and is preferably composed of water-insensitive absorbent fibers which are rigidly bonded together by a suitable bonding agent. One suitable material for the element 48 comprises viscose rayon fibers of 40-50 denier diameter and 1 to 4 inches long, disposed in maximum random orientation and resin coated with a solution of phenolformaldehyde resin and alcohol. More preferably, the viscose rayon fibers are a blend of different denier fibers, for example, 40, 20, and 5 denier fibers, in about equal proportions by weight, to obtain both a high degree of permeability and more contaminant blocking surfaces. Other resilient fibers such as wood wool, coconut fibers, or fibers of the agave family (e.g., sisal or henequen) may also be satisfactorily blended with the viscose rayon. After the fibers are resin coated, they may be compressed in a hot metal mold to obtain a molded element having fixed dimension and forming a substantially rigid and open structure. Alternatively, the filter element 48 is adapted to be molded into the configuration illustrated in FIGURE 1, directly within the filter casing 12, as will hereinafter be described.

The filter element 48 is supported within the filter casing 12 between an annular support plate 50 and an annular retaining ring or washer 52 that are disposed circumjacent a hollow cylindrical oil flow return tube 54 which extends axially through the center of the filter element 48. The support plate 50 is formed with a plurality of prick-punched perforations, generally designated 56, and also with a downwardly extending peripheral lip section 58 which abuts against the outer periphery of the top of the filter casing 12, thereby supporting the outer edge of the plate 50 within the casing 12. The medial or center section of the support plate 50 bears against a radially outwardly extending shoulder 59 which is provided by the lower side of an enlarged diameter head section 60 that is formed on the upper end of the return tube 54 and abuts against the top of the filter casing 12. A pair of intersecting diametrically extending passages 62 and 64 are formed in the top of the head section 60 and communicate at their intersection with an axially extending bore 66 that is formed through the return tube 54. A coil spring 70 is mounted coaxially of the return tube 54 and extends between the lower side of the washer 52 and the top of the filter cartridge's upper end cap 36. The spring 70 functions to maintain a compressive force on both the filter cartridge 32 and the filter element 48 to prevent possible movement of these members within the filter casing 12 during engine operation.

It may be noted that together with acting as a support means for the filter element 48, the support plate 50 functions as a migration barrier to prevent possible migration of the filtering media comprising the filter element 48 (viscose rayon, etc.), into the lubricating oil being filtered through the filter device 10. Also, it may be noted that the size of the bore 66 in the return tube 54 may be designed such that it functions as a flow control orifice and thereby limits the quantity of oil which may pass through the filter element 48.

As illustrated in FIGURE 4, the filter element 48 may, if desired, be molded into the operative configuration illustrated in FIGURE 1, directly within the filter casing 12. Prior to the actual molding operation, the flow return tube 54 and the support plate 50 are positioned within the casing 12 and the non-compacted fibrous filtering media, which has been coated with a suitable bonding agent, is placed in the open end 14 of the casing 12. An annular, reusable compressing members 78, which is provided with a disc-shaped face plate 80 that is slightly smaller in diameter than the interior of the casing 12 and is thus slidable therein, is then forced axially inward within the casing 12 to compress the filtering media between the support plate 50 and the face plate 80. The filtering media is preferably compressed to a density of about 0.20 gram per cubic centimeter. It will be seen that the member 78 is provided with an axially extending bore 82 which is adapted to receive the lower end of the return tube 54 as the member 78 moves inward within the casing 12. A suitable locking device (not shown) may be used to temporarily fix the member 78 within the casing 12 to maintain the filtering media of the filter element 48 in a compacted condition during the curing of this material. Sufficient heat is then applied to the casing 12, for example, by placing the entire casing 12 having the compressed filtering media therein within a suitable oven or the like, to properly cure the bonding agent such that the filtering media maintains its operative configuration illustrated in FIGURE 1, once the member 78 is removed from the casing 12.

It will be apparent, of course, that one of the primary advantages of molding the filter element 48 directly within the casing 12 resides in the elimination of certain molding equipment and manufacturing steps heretofore required in the fabrication of similar type filter elements. Another advantage of molding the filter element 48 within the casing 12 is to obtain a more effective utilization of the internal volume within the casing 12, that is, to more effectively use a certain volume within the casing 12 to contain the maximum amount of filtering media. Still another advantage of molding the filter element 48 directly within the casing 12 is that during the molding operation, filtering media comprising the element 48 forms a fluid-tight seal with both the inner periphery of the filter casing 12 and with the outer periphery of the flow-return tube 54, thereby preventing oil from bypassing the filter element 48 during operation of the filter 10 and obviating the need for any additional sealing means.

In operation, oil flows from the engine's lubrication system into the inlet chamber defined by the engine's filter mount, the reinforcing plate 16 and the ring-shaped gasket 28. Assuming the proper differential across the filter cartridge 32 and the filter element 48, the oil then flows through the inlet ports 22, between the resilient valve disc 42 and the top of the plate 16, and into an annular chamber 72 which is defined by the outer periphery of the filter cartridge 32, the lower side of the filter element 48 and the annular side wall of the casing 12. Because the filter element 48 is substantially less restrictive than the filter cartridge 32, the majority of the oil within the chamber 72 will pass axially upward through the filter element 48, through the prick punches 56 in the support plate 50 and into a dome-shaped chamber 74 defined by the plate 50 and the top of the filter casing 12. The oil within the chamber 74 then passes radially inwardly through the passages 62 and 64 in the head section 60 of the return tube 54 and downward through the bore 66 into a central chamber 76 defined by the inner periphery of the center tube 35. The remaining oil within the chamber 72 will pass radially inward through the filter cartridge 32 and into the central chamber 76. The oil within the chamber 76 then passes downward through the outlet passage 20 defined by the sleeve section 18 of the plate 16, and thereafter is returned through the filter mount standpipe and suitable fluid passages in the engine block to the engine's lubricating system.

Referring now to FIGURES 5 and 6, a disposable oil filter 100, in accordance with an alternate construction of the present invention, comprises a filter housing 102, an annular reinforcing plate 104 and a base plate 106 having a sealing gasket 108, all of which are substantially identical in construction and operation to their analogous components incorporated in the aforediscussed filter 10. Contained within the housing 102 is a filter cartridge 110 that comprises a pair of filter elements 112 and 114 which function in essentially the same manner as the filter cartridge 32 and the filter element 48, respectively, of the filter 10. Also contained within the filter housing 102 is an antidrain or check valve assembly 116 and a relief valve assembly 118 that function to selectively control the flow of oil within the housing 102, as will be described.

Referring now in detail to the filter cartridge 110, it will be seen that the filter element 112 is in the form of a hollow annular body which extends coaxially of the housing 102, and that the filter element 114 is in the form of a flat annular disc which extends transversely of the housing 102 directly above the filter element 112. Both of these filter elements 112 and 114 are contained within a hollow cylindrical outer shell 120 that extends coaxially within the housing 102 and is perforated circumjacent the filter element 112. A perforated cylindrical inner shell 122 also extends coaxially within the housing 102 and is coextensive of the inner periphery of the filter element 112. A fabric sock 124 is disposed around the outer periphery and over the upper end of the inner shell 122 and serves as a barrier against migration of the filtering media comprising the filter elements 112 and 114 into the interior of the inner shell 122.

The annular chamber defined by the shells 120 and 122, and within which the filter element 112 is disposed, is closed at its lower end by an annular end cap 126. The upper end of this same annular chamber is closed by the lower side of a cup-shaped member 128 that is nested within the upper end of the outer shell 120 and contains the filter element 114. The member 128 is formed with a central opening 130 of the same diameter as the inner shell 122 and which is defined by a downwardly extending flange section 132 that bears against the upper end of the inner shell 122. The lower end of the member 128 is formed with a raised annular shoulder section 134 on which is disposed a flat, annular prick-punched support plate 136. The plate 136, together with supporting the filter element 114 within the member 128, also serves as a migration barrier for the filtering media comprising the element 114.

The filter element 112 consists of a high resistance and low permeability filtering material such as cotton waste and various other materials well known in the art. These materials are packed tightly between the shells 120 and 122 and are effective to remove relatively fine particles and contaminants from the oil being filtered therethrough. The filtering media comprising the filter element 114 is somewhat less restrictive (more porous) as compared with the media comprising the element 112, and preferably consists of the same molded, self-sustaining filtering media as the filter element 48 of the aforediscussed filter 10.

The relief valve assembly 118 generally includes a valve housing 138, a valve spring 140, and an annular valve member 142 which is adapted to be resiliently engaged with a valve base member 144 that is formed with a plurality of bypass ports, generally designated 146. The specific construction and operation of the valve assembly 118 is more particularly set forth in copending application Ser. No. 208,863, filed July 10, 1962, and having the same assignee as the present invention.

The antidrain valve assembly 116 is similar in construction and operation to the antidrain valve incorporated in the filter 10, and comprises a resilient and deformable valve disc 148 whose inner periphery is compressed between the lower end cap 126 of the cartridge 110 and the valve housing 138 of the relief valve assembly 118. The outer periphery of the disc 148 is resiliently engaged with the upper surface of the reinforcing plate 104 by an annular valve plate 150 which is disposed coaxially of the relief valve assembly 118 and is formed with a plurality of circumferentially and upwardly extending tang sections 152 which resiliently bear against the lower surface of the end cap 126.

As best seen in FIGURE 6, a diametrically extending leaf spring 154 is disposed between the upper end of the filter cartridge 110 and the top of the filter housing 102. The spring 154 functions to maintain a compressive force on the filter cartridge 110, whereby the cartridge 110, relief valve assembly 118 and antidrain assembly 116 are resiliently urged against the reinforcing plate 104 to prevent any relative movement of any of these members during engine operation.

In operation, oil flows from the engine's lubrication system into an inlet chamber defined by the upper surface of the reinforcing plate 104, the lower side of the valve housing 138 and the valve disc 148. Assuming the proper differential across the filter cartridge 110, oil then flows past the antidrain valve assembly 116 and into an annular chamber 156 which is defined by the outer shell 120, the top of the filter element 114, and the inner periphery of the filter housing 102. By virtue of the fact that the filter element 114 is substantially less restrictive than the filter element 112, a substantially large portion of the oil within the chamber 156 will pass axially downward through the filter element 114 and into the interior of the inner shell 122. That portion of the oil which does not flow through the filter element 114 will pass radially inwardly through the filter element 112 and into the interior of the inner shell 122, which oil, together with the oil which has been filtered through the element 114, will pass downward through the valve assembly 118, and thereafter be returned through suitable fluid passages to the engine's lubrication system.

In the event the back pressure in the chamber 156 becomes excessive, for example, when the filter cartridge 110 becomes clogged, unfiltered oil will be forced upward through the bypass ports 146 in the valve assembly 118, thereby unseating the valve member 142. This unfiltered oil then flows into the interior of the inner shell 122 from where it is returned to the engine's lubrication system, as above described.

A particular feature of the aforediscussed filter units 10 and 100 resides in the configuration of the filter elements 48 and 114 incorporated therein. Specifically, due to the disc-shaped configuration of the filter elements 48 and 114, the areas of the inlet and outlet (upper and lower) sides of these elements are substantially equal. Accordingly, the oil that is transmitted through these elements during the operation of the filter units 10 and 100 is subjected to virtually no velocity gradient, resulting in a minimum of back pressure across these filter elements and a corresponding high filtering efficiency for the entire filter units.

It may be noted that since the filter element 112 in the filter unit 100 is composed of cotton waste and the like, it is capable of absorbing moisture, chemicals, etc., from the oil being filtered therethrough, resulting in the filter element 112 swelling within the housing 102. An objection to heretofore known two-stage filter units of the described type has been that when the dimensions of one of the filter elements increases (due to absorbed moisture and the like), the second filter element becomes compressed within the filter housing, thereby decreasing the porosity of this second filter element and accordingly decreasing the filtering efficiency of the entire unit. However, it will be seen that in the filter unit 100 of the present invention, the filter element 114 is spaced away from the filter element 112 such that a dimensional increase in the latter element 112, will not adversely affect the filtering properties of the filter element 114. Accordingly, another feature of the present invention resides in the fact that filter units described herein will continue to efficiently filter oil transmitted therethrough, even though one of the filter elements experiences a dimensional change due to absorbed moisture and the like.

It may be noted that even in the event the filter elements 112 and 114 are arranged so as to abut each other, by virtue of the fact that the element 114 is of a rigid construction, it will resist compression and maintain its designed porosity even though the size of the element 112 increased due to absorbed moisture.

While it will be apparent that the exemplary embodiments herein illustrated are well calculated to fulfill the objects above stated, it will be appreciated that the invention is susceptible to modification, variation and change without departing from the proper scope or fair meaning of the subjoined claim.

What is claimed is:

A multi-stage parallel flow filter assembly of the throw away type comprising a filter housing, said filter housing comprising a generally cylindrical outer shell closed at one end by an integral end wall and closure means for the other end of said outer shell, a fluid outlet passage formed centrally in said filter housing closure means, fluid inlet means formed in said closure means around said fluid outlet passage, a first filter element contained in said filter housing and interposed in the path of fluid flow from said fluid inlet means to said fluid outlet passage, said first filter element having a substantially annular shape defined by an outer generally cylindrical surface and an inner generally cylindrical surface, said inner surface of said first filter element defining a central flow passage, first end closure means for said first filter element forming a seal for the end of said first filter element adjacent said housing closure means and for sealingly engaging said closure means around said fluid outlet passage whereby said central flow passage of said first filter element is in registry at one end thereof with said filter housing fluid outlet passage, said outer surface of said first filter element being spaced radially inwardly of said cylindrical portion of said outer shell for fluid communication with said fluid inlet means of said filter housing for radial fluid flow through said first filter element, an end cap sealingly engaging the other end of said first filter element and forming a closure for the other end of said central flow passage, a second filter element, said second filter element being of the depth type and having spaced first and second surfaces, the periphery of said second filter element between said surfaces being bonded to said outer shell adjacent said integral end wall, said first surface of said second filter element being axially spaced from said end cap of said first filter element and in fluid communication with said filter housing fluid inlet means, said second surface of said second filter element being spaced from said integral end wall and defining a fluid cavity therebetween, means forming a fluid passage between said fluid cavity and said central flow passage of said first filter element extending through said second filter element and through said end cap, and biasing means for urging said first end closure means into sealing engagement with said closure means of said filter housing.

References Cited

UNITED STATES PATENTS

| | | | |
|---|---|---|---|
| 1,074,679 | 10/1913 | Wise | 210—318 |
| 2,098,725 | 11/1937 | Hurn | 210—132 |
| 2,108,798 | 2/1938 | Dalrymple | 210—315 X |
| 2,179,784 | 11/1939 | Frudden | 210—439 |
| 2,203,668 | 6/1940 | Burckhalter | 210—439 |
| 2,888,141 | 5/1959 | Coates et al. | 210—440 |
| 2,936,891 | 5/1960 | Kukowski et al. | 210—136 X |
| 3,229,817 | 1/1966 | Pall | 210—130 |

FOREIGN PATENTS

| | | |
|---|---|---|
| 236,052 | 6/1960 | Australia. |
| 1,300,086 | 6/1962 | France. |
| 1,338,141 | 8/1963 | France. |
| 1,368,602 | 6/1964 | France. |
| 588,224 | 5/1947 | Great Britain. |
| 894,916 | 4/1962 | Great Britain. |

REUBEN FRIEDMAN, *Primary Examiner.*

F. SPEAR, *Assistant Examiner.*